March 24, 1964    J. C. BERGER, JR    3,126,434
DAMPING OF SURFACE MOVEMENT OF QUENCH BATH IN
MELT SPINNING PROCESS
Filed July 24, 1961
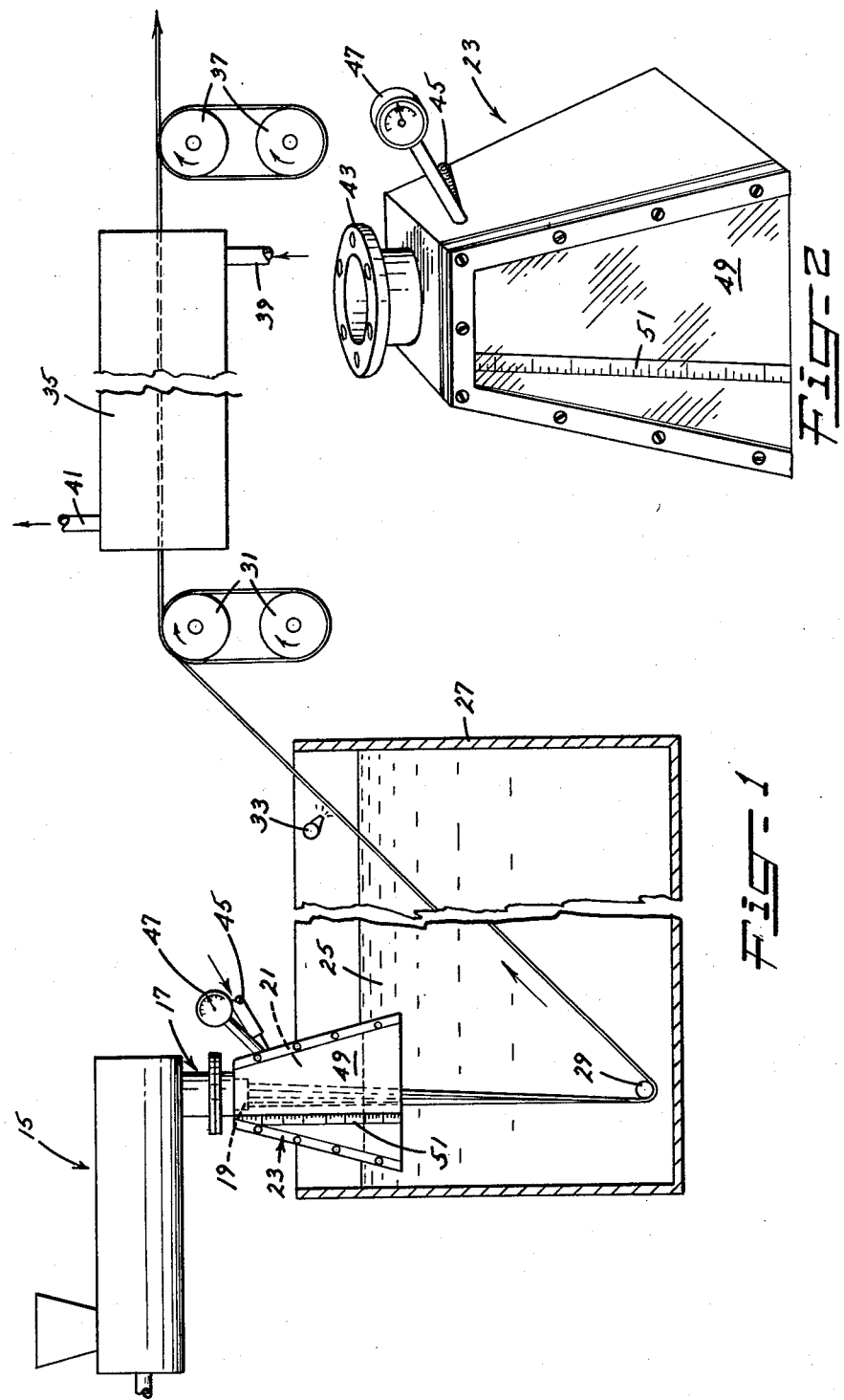

United States Patent Office 3,126,434
Patented Mar. 24, 1964

3,126,434
DAMPING OF SURFACE MOVEMENT OF QUENCH BATH IN MELT SPINNING PROCESS
Joseph C. Berger, Jr., Folsom, Pa., assignor to Avisun Corporation, Philadelphia, Pa., a corporation of Delaware
Filed July 24, 1961, Ser. No. 126,042
6 Claims. (Cl. 264—178)

The present invention relates to the manufacture of filaments from polymeric materials, and more particularly to a method for melt spinning of monofilaments having improved physical properties.

In the production of monofilaments from polymeric materials by known melt spinning procedures, a molten material is shaped into a filament form, passed through an air gap of from ¼ inch to 1½ inches, and then quenched by a liquid bath. The monofilament thus formed is generally of extremely low tenacity and high elongation and is therefore drawn while in a heated condition to transform the same into a relatively strong structure.

While the above-described procedure is conventional in the art, it has proven to be highly restrictive or unsatisfactory in the manufacture of monofilaments of comparatively fine denier. Generally, it is necessary to increase the melt temperature of the polymeric material as the denier of the monofilament is reduced to avoid melt fracture during spinning. The higher temperature of the melt employed, however, the greater is the tendency of the polymeric material to degrade. For example, in spinning polypropylene into a 180 denier monofilament, it is necessary to heat the polymeric material to a temperature of about 560° F. to avoid melt fracture during extrusion of the same through a die opening of about 26 mils. At this elevated temperature, however, some degradation of the polymeric material occurs thus providing a filament which is unsatisfactory for many purposes.

The primary object of the present invention is to provide new or improved and more satisfactory method for melt spinning of polymeric materials into monofilaments of desired denier.

Another object of the present invention is to provide a method for melt spinning of polymeric materials into monofilaments of improved uniformity and strength regardless of filament denier.

These and other objects of the present invention will become more apparent from the following description and claims.

The objects of this invention are achieved by extruding a molten polymeric material downwardly through a jet or die to provide one or more independent filamentary streams, passing the extruded streams through a relatively long gaseous atmosphere and into a liquid bath, with both the gaseous atmosphere and the surface of the liquid bath maintained in a substantially quiescent condition, and taking-up the quenched filaments at a speed greater than the rate of extrusion. The quiescent gaseous atmosphere, which extends from the die to the liquid quench bath, may be as long as 10 or 12 inches or more so that an adequate opportunity is provided for stretching the individual extruded streams of filamentary material to a desired size before they are quenched. Thus, with this procedure monofilaments of fine denier may be produced employing dies having relatively large openings and without resorting to high melt temperatures. For example, a 180 denier monofilament may be formed from polypropylene by extruding the polymer at a temperature of about 470° F. through a die opening of 52 mils, with the extruded stream being drawn to the desired denier while passing through a quiescent gaseous atmosphere of about 10 inches and then quenched within a liquid bath.

Aside from facilitating the production of comparatively fine denier monofilaments, the relatively long gaseous atmosphere provided between the jet and the quenching bath permits the individual extruded streams of polymeric material to relieve themselves of stresses which may be induced during actual spinning thereof. Further, the inertia of the individual extruded streams, combined with the drag of the surrounding gaseous atmosphere as the streams travel therethrough, subject the filamentary streams to a desired tension so that orientation of the polymer molecules is effected. This molecular orientation during the filament formation provides the resulting filament with improved strength over that which can be achieved by conventional procedures. It will be understood, however, that the quenched or as-spun filament, as produced in accordance with the present invention, is preferably subjected to the usual after-drawing operation to further enhance its physical properties.

As apparent from the above description, the present invention differs from conventional monofilament melt spinning precedure in that the extruded streams of filamentary material are passed through a relatively long gaseous atmosphere before being quenched in a liquid bath, with the gaseous atmosphere and the surface of the liquid quenching bath being maintained in a quiescent condition. In general, the art has associated improved physical properties of monofilaments with rapid quenching of the filamentary stream and thus the air gap between the extrusion die and the quench bath surface is held to a minimum. In effect, denier variations along the length of the filament became more pronounced as the length of such air gap was increased. At an air gap of 6 inches, for example, denier variations of as much as ±50% or more in a resulting single filament were not uncommon with conventional spinning procedures.

The process of the present invention is predicated upon the discovery that the large sacrifice in filament uniformity, which results when a relatively long air gap is employed in conventional spinning operations, is caused by turbulence in both the air currents in the ambient atmosphere and the liquid quenching bath. Such turbulence stems from a variety of sources, as for example the normal movements of the operator, the ventilating system, vibrations transmitted from the spinning equipment and supporting structure, etc. While the source and often the presence of such turbulence may be difficult to detect, its effect on the highly plastic extruded streams is apparent in the non-uniformity of the resulting filaments.

The apparatus for effecting the method of the present invention includes a jet or die for shaping the molten polymeric material into a desired filamentary stream, a tank for containing a liquid quenching bath, means for heating and drawing the quenched filament, and a hood which encircles the filamentary stream during its travel from the jet to and under the surface of the liquid quenching bath. The hood extends below the surface of the liquid quenching bath and serves to shield the extruded filamentary stream of polymeric material from air currents in the ambient atmosphere. Valve means are provided on the hood whereby air or other gas may be introduced and maintained under pressure to dampen any turbulence, such as ripples or surging, which might otherwise be present along the surface of that portion of the liquid quenching bath located within the hood itself.

As hereafter employed, the terminology "jet stretch" refers to the tension applied to the individual extruded streams of filamentary material during their passage through the quiescent gaseous atmosphere immediately below the jet or die. While the extruded filamentary streams will have different speeds during travel through such atmosphere, as a result of at least partial surface solidification thereof, it will be understood that the tension or jet stretch to which the filamentary streams are subjected is a result of collecting or taking-up the quenched filaments at a speed which exceeds the speed at which the molten polymeric material is extruded through the jet. Further, for the sake of brevity and ease of description, the terms "filament" and "monofilament" are intended to denote the same structure. While the method of the present invention is useful with a variety of thermoplastic polymeric materials, the invention is hereafter described as employed in the melt spinning of monofilaments from polymers of propylene.

In the accompanying drawing, FIGURE 1 is a view illustrating the apparatus employed in the practice of the method of the present invention; and FIGURE 2 is a perspective view of one element of the apparatus shown in FIGURE 1.

With reference to FIGURE 1 of the drawing, a polymeric material, as for example polypropylene, is initially brought to a molten, degasified and compressed condition by a suitable means, such as a conventional screw type extrusion apparatus indicated generally at 15. A pump, not shown, delivers the molten polymer at a predetermined metered rate to an extrusion assembly 17 which includes a jet 19, and which may be encased by one or more heaters for maintaining a molten polymer at a desired temperature until actual shaping of the same. The molten polymer, extruded from the jet 19 as a plurality of individual streams, is passed through a gaseous atmosphere, indicated at 21, which is maintained in a quiescent condition by a hood 23 and is then quenched within a bath 25 of water or other suitable liquid contained within a tank 27. The quenched filaments are passed around a spreader bar 29 which is supported within and by the tank 27 and are then directed upwardly to and around a pair of godets 31. Preferably, liquid is removed from the quenched filaments as they leave the bath 25 by means of a wiper or air nozzle, such as shown at 33.

The pair of godets 31 are rotated at speeds which are greater than and accurately related with the polymer spinning or extrusion rates so as to stretch the extruded filaments to a desired denier as they travel through the quiescent atmosphere 21, and to achieve orientation of the polymer molecules as the individual filaments assume at least a partial surface set. From the godets 31 the filaments are passed through a chamber 35 and then over a second pair of godets 37. As in conventional filament after-stretching procedures, the quenched filaments are preferably stretched from about 3 to 10 or more times their original length between the pairs of godets 31 and 37. The chamber 35 is heated by a fluid medium circulated through pipes 39 and 41 so that the portions of the filaments passing therethrough are heated sufficiently to facilitate the desired stretching effect without actually causing fusion of the filaments themselves.

As heretofore mentioned, one of the primary advantages of the present invention is that monofilaments of fine denier and which possess improved uniformity and strength can be produced without resorting to high melt temperatures and without risk of melt fracture during spinning. This result is achieved by extruding the molten polymer through a jet having a large opening, followed by drawing or jet stretching of the extruded streams of polymer to a desired denier as they travel through the polymer to a desired denier as they travel through the atmosphere of air or other gas and before they are quenched within the liquid bath. Aside from providing a gaseous atmosphere of sufficient length to permit drawing of the extruded streams of molten polymer to the desired size, it is essential for the satisfactory practice of this procedure that both the gaseous atmosphere and the surface of the liquid quench bath be maintained in a substantially quiescent condition to minimize filament distortion.

The above critical operating conditions of the present invention are satisfied by the use of the hood 23 which, as shown in FIGURE 1, encircles the extruded streams of molten polymer during their passage through the gaseous atmosphere between the jet 19 and the liquid quench bath 25. As shown in FIGURE 2, the hood 23 includes a supporting flange 43, a valve 45, a combination pressure gauge and relief valve 47, and at least one transparent wall 49 to permit observation of the spinning operation. Preferably, the hood is wider at its lower end to permit the quenched filaments to assume a fanned relationship as they pass under the spreader bar 29.

In preparing the apparatus for use, the hood flange 43 is secured to and supported by the extrusion assembly 17, with a gasket or like material provided between these parts to insure the formation of an air-tight joint. With the lower end of the hood 23 being submerged within the liquid bath, air or other gas is then introduced into the hood 23 under pressure through the valve 45 to dampen and prevent surface movement of that portion of the liquid quench bath located within the hood itself. The gas pressure within the hood 23 will generally be within the vicinity of 2 to 3 pounds per square inch but will vary with the operating conditions. Thus, the hood 23 should be of such length as to provide for a sufficient head of liquid, as measured by the scale 51, to prevent the escape of gas during the different desired conditions of spinning which may be employed.

It will be noted that the gas within the hood 23 is not intentionally circulated so that distortion of the extremely plastic streams of polymer at this stage is avoided. Further, in view of the pressure of this contained atmosphere, the extruded streams of polymer are subjected to increased drag thus providing for greater orientation of the polymer molecules and improved tenacity in the resulting filament. During the spinning operation the walls of the hood 23 and the quenching liquid bath 25 both serve to remove heat from the atmosphere contained within the hood 23. Thus under usual conditions the atmosphere contained within the hood is at a lower temperature than the extruded polymer and generally no venting of the hood is required.

As heretofore mentioned, the production of fine denier monofilaments by conventional melt spinning procedures entails extremely critical control and often results in polymer degradation and unsatisfactory products. The filaments produced by known methods generally possess tenacity ranging from about 5.5 to 6.0 grams per denier (g./d.) and uniformity averaging ±15%, and as high as ±50%. As illustrated by the following examples, the method of the present invention requires less critical control and facilitates the production of filaments having improved properties, as for example filaments having a tenacity of 6.5 g./d. and over and an average uniformity of about ±6.6%.

*Example I*

Polypropylene, having a melt index of 2.4, was delivered into a conventional extruder having a barrel of 1½ inches in diameter and was rendered molten during its advancement by a screw rotating at 53 revolutions per minute. The extruder had an output of 13.2 pounds of polymer per hour which was delivered at a temperature of about 470° F. to a jet having an orifice of 52 mils in diameter. The jet was located about 10 inches above the surface of a water bath, which was maintained at a temperature of about 90° F., and was encircled by a hood, the lower end of which was submerged within the bath itself. Air under pressure of about 2 pounds per square inch was contained within the hood and served to dampen and prevent surface fluctuations along that portion of the bath located within the hood itself.

A jet stretch of about 2.5 was applied to the stream of molten polypropylene extruded through the jet opening by a first pair of godets rotating at about 50 feet per minute. The resulting quenched or as-spun filament was heated within a chamber to a temperature of about 325° F. after leaving the first pair of godets and was then stretched by a second pair of godets rotating at a speed of about 350 feet per minute. As measured by a conventional Brush Uniformity Tester the resulting stretched filament had a uniformity of ±6% and in view of the low melt temperature and the large diameter jet opening employed, no degradation of the polymer or melt fracture was experienced during spinning.

*Example II*

Employing the apparatus as described in Example I, polypropylene having a melt index of 2.4 was heated to a temperature of 450° F. and extruded through a plurality of die openings 52 mils in diameter. The extruded streams were passed through a quiescent atmosphere of air, which was about 10 inches in length and under a pressure of about 2 pounds per square inch, and then quenched in a water bath having a temperature of about 90° F. During their passage through the quiescent air atmosphere the polymer streams were subjected to a jet stretch of about 3.4. The quenched filaments were then passed through the conventional after-stretching stage in a manner as described in Example I. The properties of the resulting filaments were as follows:

| Run | Denier | Tenacity, in grams | Tenacity, g./d. | Percent elongation at break |
|---|---|---|---|---|
| No. 1 | 363 | 2,400 |  | 20.1 |
|  |  | 2,400 |  | 21.9 |
|  |  | 2,450 |  | 20.2 |
|  |  | 2,416 | 6.65 | 20.7 |
|  |  | 2,290 |  | 20.7 |
| No. 2 | 368 | 2,380 |  | 21.0 |
|  |  | 2,450 |  | 19.8 |
|  |  | 2,373 | 6.44 | 20.5 |
|  |  | 2,270 |  | 19.3 |
| No. 3 | 345 | 2,250 |  | 22.1 |
|  |  | 2,230 |  | 21.2 |
|  |  | 2,250 | 6.52 | 20.9 |
|  |  | 1,980 |  | 23.5 |
| No. 4 | 300 | 2,030 |  | 22.2 |
|  |  | 2,050 |  | 21.3 |
|  |  | 2,020 | 6.73 | 22.3 |

As measured by a conventional Brush Uniformity Tester, the above samples had an absolute uniformity of 6.615%.

*Example III*

With the apparatus as described in Example I, polypropylene having a melt index of 4.74 was heated to 470° F. and then extruded through a plurality of die openings of 52 mils in diameter at the rate of 20.3 pounds per hour. The extruded streams were passed through a quiescent atmosphere of air which was about 7 inches in length and under a pressure of about 2 pounds per square inch and then quenched in a water bath at a temperature of 85° F. The resulting quenched filaments were wrapped 5 times about a first pair of godets which were traveling at 60 feet per minute so that the extruded streams of polypropylene were jet stretched before being quenched to provide desired 180 denier filaments. From the first pair of godets, the filaments were heated to about 375° F. and wrapped about a second pair of godets traveling at 547 feet per minute and were thereby stretched 9 times their original length. The properties of the resulting filaments were as follows:

| Denier | Tenacity in grams | Tenacity, g./d. | Percent Elongation at Break |
|---|---|---|---|
| 180 | 3,435 | 7.32 | 14.84 |
|  | 3,685 | 7.85 | 16.51 |
|  | 3,670 | 7.72 | 17.50 |
|  | 3,625 | 7.63 | 17.09 |

It is to be understood that changes and variations may be made without departing from the spirit and scope of the invention as defined in the appended claims.

I claim:

1. Process for the production of shaped articles, which comprises shaping a molten polymeric material into the form of a continuous filamentary stream, passing the shaped stream through a contained quiescent gaseous atmosphere and into a liquid quench bath to provide a continuous filament and maintaining the quiescent gaseous atmosphere under pressure to dampen movement of the surface of that portion of the liquid bath adjacent to the quiescent gaseous atmosphere.

2. A process as defined in claim 1 further including the step of stretching the shaped stream of polymeric material during its passage through the quiescent gaseous atmosphere to reduce the same to a desired denier and to effect at least partial orientation of the polymer molecules thereof.

3. A process as defined in claim 2 further including the step of heating the quenched filament and stretching the quenched filament to effect additional orientation of the polymer molecules thereof.

4. A process as defined in claim 1 wherein said contained gaseous atmosphere is air and wherein the passage of the shaped stream of polymeric material through the contained gaseous atmosphere is at least 4 inches in length.

5. A process as defined in claim 1 wherein the passage of the shaped stream of polymeric material through the contained gaseous atmosphere ranges from about 4 to 12 inches in length.

6. A process as defined in claim 1 wherein the liquid bath is water and wherein said contained gaseous medium is air under a pressure of about 2 pounds per square inch.

References Cited in the file of this patent

FOREIGN PATENTS

| 1,122,854 | France | Sept. 19, 1956 |
| 1,226,310 | France | July 11, 1960 |